Patented Mar. 11, 1941

2,234,204

UNITED STATES PATENT OFFICE 2,234,204

PLASTIC POLYMER OF BUTADIENE AND PROCESS OF PRODUCING SAME

Howard W. Starkweather, New Castle County, and Mortimer A. Youker, Gordon Heights, Del., assignors to E. I. du Pont de Nemours & Company, Wilmington, Del., a corporation of Delaware No Drawing. Application March 28, 1939, Serial No. 264,582

17 Claims. (Cl. 260—36)

This invention relates to rubber-like synthetic products. More particularly it relates to the manufacture of plastic rubber-like products from butadiene hydrocarbons. Still more particularly it relates to the polymerization and plasticization of butadiene hydrocarbons.

The polymerization of butadiene gives two technically important types of polymers, with many of the properties of natural rubber. One type is made by polymerizing butadiene with another polymerizable substance, such as styrene or acrylic nitrile, in the form of an aqueous dispersion. When compounded and cured, many of these products are comparable with natural rubber in strength and elasticity and in some instances are superior to natural rubber in certain properties, for example, in resistance to the action of certain solvents. They all have the serious disadvantage, however, of being difficult to process and utilize. Thus, for example, they lack plasticity and tackiness and hence are very difficult to mix with compounding ingredients by milling, to form into sheets, tubes, etc., and to build up into composite articles such as tires. On the other hand, the second type of product, made by polymerizing butadiene in the presence of sodium, has better working properties but, when cured, is inferior to natural rubber in almost all respects.

It is therefore an object of the present invention to make plastic and easily processed rubber-like products from butadiene hydrocarbons. A more specific object is to prepare, from these hydrocarbons, plastic rubber-like products having superior resistance in the vulcanized state to the action of petroleum hydrocarbons and the like. Another object is to prepare polymeric products of widely varying plasticities from these hydrocarbons, and to control the process so as to obtain a product of the desired plasticity. A further object is to provide a method for producing plastic polymers from polymers of butadiene and its homologs which polymers have been prepared by polymerizing the diene hydrocarbon in the presence of sulfur. A still further object is to provide an improved process for producing sulfur containing polymers from butadiene and its homologs. Still another object is to produce dispersions of such sulfur containing polymers which have novel properties and to utilize such dispersions in the production of useful articles of manufacture. A further object is to produce polymers of butadiene and its homologs which may be readily plasticized. Still a further object is to plasticize polymers of butadiene and its homologs by a method which does not require extensive milling, which does not require the introduction of substances which must afterward be removed and which renders it practical for users to have available for use polymers of butadiene and its homologs which have a wider variety of degrees of plasticity. Another object of the invention is to prepare polymers of butadiene and its homologs which are truly fluid, that is, which are truly capable of flowing under the influence of any unbalanced pressure however small. A more specific object is to provide very stable latices of sulfur containing polymers of butadiene and its homologs. Other objects will appear hereinafter.

These objects are accomplished by incorporating into polymers of butadiene hydrocarbons obtainable by polymerizing the butadiene hydrocarbon in the presence of sulfur and in the presence or absence of one or more other polymerizable compounds, one or more compounds of the general formula R—S—R$_1$, where R is an alkyl, aryl, thiazyl, thiocarbamyl, xanthogenyl, thioxanthogenyl, aromatic acyl, or aromatic thioacyl group and R$_1$ is hydrogen, a base-forming radical, or a group represented by —S$_n$—R, in which $n$ is a whole number less than four and R is one of the groups represented by R above and then subjecting the polymers to conditions adapted to develop plastic properties. Thus, the invention includes the development, promotion, and/or acceleration of the plasticizing action of these compounds by aging, heating, and/or milling the polymer into which they have been incorporated and/or by adding basic substances, for example, amines which give bases with dissociation constants greater than about $10^{-6}$. The sulfur containing polymer may be prepared in any desired manner so long as sulfur is present during the polymerization but it is preferably prepared by dissolving sulfur in the butadiene hydrocarbon, then dispersing the resulting solution in an aqueous medium and thereafter polymerizing the hydrocarbon while it is in the dispersed state. This application is a continuation in part of applicants' copending application Serial No. 221,006, filed July 23, 1938.

The varied embodiments of this invention are illustrated in the following examples. It should be understood, however, that these examples are intended to be illustrative only and are not intended to limit the scope of the invention and that the examples numbered 9 and 20 are introduced to show the effect of the omission of certain essential ingredients and hence are not embodiments of the present invention.

In these examples and throughout this application, whenever the term "plasticity number" is used, it refers to the thickness in thousandths of an inch of a sample 2.0 cc. in volume in the form of a cylinder one centimeter high (before compression) which has been heated to 80° C. for 15 minutes and then kept under a weight of 5 kilograms for 3 minutes at 80° C. Thus, the lower the "plasticity number," the greater is the plasticity. The term "regain" or "recovery," whenever hereinafter used, refers to the increase in thickness (in thousandths of an inch) of the compressed sample which takes place in one minute on removing the compressing weight and allowing the sample to return to room temperature.

In the first eleven of these examples, details of which are given in Table I, each charge consisted of 100 parts of butadiene-1,3 (henceforth referred to as butadiene) and (unless otherwise indicated) 50 parts of the other polymerizable compound designated, 33 parts of carbon tetrachloride, 0.8 part of benzoyl peroxide, the stated quantity of sulfur (finely powdered flowers of sulfur) and 200 parts of water containing 4 parts of C-cetyl betaine

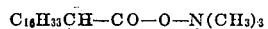

and 0.4 part of acetic acid. These ingredients were introduced into long, thick-walled cylindrical glass vessels which were then sealed with rubber stoppers. The water-insoluble ingredients were then dispersed and the butadiene, etc., polymerized by rotating each tube about an axis perpendicular to its length at about 35 R. P. M. in a water bath at 60° C. for the number of hours given in the table. The resulting latex-like dispersions were coagulated by adding ethyl alcohol. The coagulum was dried by milling on a warm mill, 1% of phenyl beta-naphthylamine (based on the dry weight) being added as an antioxidant. There resulted a rough sheet of somewhat plastic material, having the plasticity number and recovery given in the table in column A. The yield, based on the total amount of polymerizable material, is also given in Table I. This material was then plasticized by incorporating, on the rubber mill, 1% of its weight of tetra-methyl thiuram disulfide and 2% of dibutyl amine. This plasticized material was not only much more plastic than the original, as shown by the plasticity numbers and recoveries given in column B, but further resembled well plasticized natural rubber in having a moderate degree of tack, so that it adhered readily to itself, and in giving benzene solutions of relatively low viscosity. To illustrate an alternative method for plasticizing, portions of each product containing the tetramethyl thiuram disulfide were stored at 70° C. instead of being treated with dibutyl amine. The plasticization obtained after 24 hours of such storage is shown by the plasticity numbers and recoveries given in column C.

Example 12

Seventy-five parts of butadiene and 25 parts of methacryl urea, 0.5 part of sulfur, 22 parts of carbon tetrachloride and 0.5 part of benzoyl peroxide were dispersed in 127 parts of water containing 8 parts of C-cetyl betaine and 0.3 part acetic acid and polymerized for 65 hours at 60° C. as in the preceding examples. The polymer (61% yield) after isolation and treatment with anti-oxidant as described above had a plasticity number of 183 and a recovery of 24. One hundred parts of this polymer treated with 2 parts of tetra methyl thiuram disulfide and 1 part of dibutylamine on a rubber mill was plasticized to a considerable extent, the new plasticity number being 106 and the recovery 3.

Example 13

Direct substitution of styrene for the methacryl urea in the preceding example gave an unplasticized product (88% yield) with a plasticity number of 162 and a recovery of 97. Treatment of 100 parts of this polymer with 2 parts of tetra methyl thiuram disulfide and 2 parts of di-ortho-tolyl guanidine reduced the plasticity number to 130 and the recovery to 35. Aging for 1 day at 70° C. caused a further reduction to 90 and 4. One hundred parts of the same unplasticized polymer treated with 2 parts of tetra methyl thiuram disulfide and 2 parts of thio-beta-naphthol gave a plasticity of 101 and a recovery of 12 without additional heat treatment. A condensation product of acetaldehyde with aniline and para-toluidine substituted for the naphthol above gave a plasticity number of 93 and a recovery of 7.

Example 14

Seventy-five parts of butadiene and 25 parts of the methyl ester of beta-alpha-furyl acrylate were polymerized as in the preceding two examples except that 0.75 part of sulfur were used. The yield was 81%. The original plasticity number of 237 and recovery of 199 were reduced to 120 and 10, respectively, by treatment with 2% of tetramethyl thiuram disulfide and 2% of di-ortho-tolyl guanidine on a rubber mill.

Example 15

Sixty parts of butadiene and 40 parts of the methyl ester of alpha-chlor-acrylic acid were polymerized in exactly the same way as the butadiene and styrene in Example 13. The yield was 92%. Treatment as in Example 14 gave a plasticity number of 62 and a recovery of 5.

*Table I*

| Example No. | Other polymerizable compounds | Sulfur, parts | Time, hours | Yield, percent | Plasticity number and recovery | | |
|---|---|---|---|---|---|---|---|
| | | | | | A | B | C |
| 1 | None | 0.4 | 113 | 69 | 148–27 | 118–12 | |
| 2 | M. A. N.[1] | 0.3 | 112 | 92 | 198–65 | 155–12 | |
| 3 | M. A. N.[1] | 0.6 | 112 | 96 | 228–83 | 134–8 | |
| 4 | M. A. N.[1] | 1.5 | 93 | 80 | 178–46 | 62–0 | 94–1 |
| 5 | M. A. N.[1] | [6] 0.6 | 97 | 60 | 288–75 | 165–27 | 120–17 |
| 6 | M. A. N.[1] | [5] 0.3 | 112 | 66 | 333–118 | 96–0 | 117–12 |
| 7 | A. N.[2] | 0.6 | 80 | 82 | 180–45 | 85–1 | |
| 8 | M. M. A.[3] | [1,7] 2.0 | 168 | 73 | 153–17 | 50–0 | 85–0 |
| 9 | M. M. A.[3] | [1,7] 0.0 | 168 | 80 | 177–57 | 150–40 | 187–113 (control) |
| 10 | Chloroprene | 0.6 | 97 | 83 | 220–192 | 127–10 | |
| 11 | Chloroprene+M. A. N.[1,4] | 0.3 | 112 | 75 | 370–124 | 92–1 | |

[1] M. A. N. is methacrylic nitrile.
[2] A. N. is acrylic nitrile.
[3] M. M. A. is methyl methacrylate.
[4] This charge contained 50 parts each of butadiene, chloroprene, and M. A. N.
[5] This charge contained no benzoyl peroxide.
[6] This charge contained no carbon tetrachloride.
[7] Cetyl trimethyl ammonium bromide used as emulsifying agent.

Further examples of plasticizing the polymers of butadiene hydrocarbons prepared in the presence of sulfur are given in Table II. The polymer to be plasticized was prepared as in Example 3 except that methyl methacrylate was used instead of methacrylic nitrile, the yield being 82% and the plasticity 145 and the recovery 38 without the addition of any plasticizing agent. Into separate portions of this polymer the agents given in the table were incorporated by milling in the indicated percentages by weight. The plasticity numbers and recoveries shown in the table were then determined for these plasticized materials. Parallel results were obtained with a polymer similar to that of Example 4, but made with acrylic nitrile instead of methacrylic nitrile.

Table II

| Example No. | Plasticizing agents | Plasticity number | Recovery |
| --- | --- | --- | --- |
| 16 | 2% tetramethyl thiuram disulfide. 1% dibutyl amine | 58 | 2 |
| 17 | 2% tetramethyl thiuram disulfide. 1% piperidine | 56 | 2 |
| 18 | 2% dibenzothiazyl disulfide. 1% dibutyl amine | 75 | 2 |
| 19 | 2% dibenzoyl disulfide. 1% dibutyl amine | 55 | 3 |
| 20 | 2% diphenyl disulfide. 1% dibutyl amine | 118 | 11 |
| 21 | 2% thiobetanaphthol | 52 | 1 |
| 22 | 2% mercaptobenzothiazol | 108 | 9 |
| 23 | 2% potassium hexamethylene-dithio-carbamate | 69 | 1 |
| 24 | None | 145 | 38 (control) |

Further examples of plasticizing, using other agents, are given in Table III. The polymer plasticized therein was made as in Example 14 except that acrylic nitrile was used in place of the furyl acrylic ester. The yield was 85%, plasticity number before plasticization was 233 and the recovery 127.

Table III

| Example No. | Plasticizing agents | Plasticity number | Recovery |
| --- | --- | --- | --- |
| 25 | 2% tetramethyl thiuram disulfide. 2% di-ortho-tolyl guanidine | 110 | 10 |
| 26 | 2% bis-isopropyl xanthogen | 129 | 13 |
| 27 | 2% bis-isopropyl xanthogen. 2% di-ortho-tolyl guanidine | 110 | 11 |
| 28 | 2% bis-ethyl thio-xanthogen. 2% di-ortho-tolyl guanidine | 105 | 11 |

The present invention is much broader in scope than the above examples, which have been limited, particularly with respect to the materials employed, in order to illustrate the effects of the change in one variable at a time. The materials used at all points in the process, their relative proportions, and the physical conditions under which the process is carried out are all, in fact, subject to wide variation, as will be discussed below.

The butadiene used in the above examples was prepared by vapor phase catalytic dehydration of 1,3-butylene glycol. Other sources of butadiene may also be used, however, for example, butadiene obtained as a by-product in the cracking of petroleum distillates. The butadiene is preferably substantially pure. It may be obtained in this state of purity by any of the common methods, for example, by causing it to react with sulfur dioxide, freeing the resulting addition product from unreacted hydrocarbons, and regenerating the butadiene from the addition product.

Furthermore, instead of butadiene-1,3, the diene polymerized may be any butadiene hydrocarbon capable of giving a rubber-like polymer, or, in general, butadiene-1,3 and its homologs in which the substitution is on the middle carbon atoms. Other dienes which may be mentioned as being particularly suitable are isoprene, and dimethyl-2,3,-butadiene-1,3. These butadiene hydrocarbons may be used individually or in admixture with each other, or with one or more other polymerizable unsaturated compounds, particularly polymerizable organic compounds containing at least 2 carbon atoms in an open chain joined by more than one bond or with one or more saturated or unsaturated compounds which are not polymerizable under the conditions used.

As examples of polymerizable unsaturated compounds of the above type there may be mentioned hydrocarbons such as styrene, pinene, camphene, monovinyl acetylene, and divinyl acetylene, alcohols and their esters (either organic or inorganic), such as vinylethinyl alkyl carbinols, vinyl acetate, vinyl chloride, and tetramethallyl orthosilicate, aldehydes and ketones such as acrolein and methyl vinyl ketone, and acids and their derivatives such as acrylic, methacrylic, chloracrylic, and furyl acrylic acids, butyl acrylate, methyl methacrylate, methyl chlor-acrylate, furyl acrylate, acrylic amide, methacryl urea, acrylic nitrile, methacrylic nitrile, dimethyl fumarate, and the natural drying oils, as well as still other types of unsaturated, polymerizable compounds such as vinyl phthalimide, vinyl ethyl sulfide, and particularly, halogen substituted dienes such as chloroprene.

The proportion and type of polymerizable unsaturated compound used along with the rubber-forming butadiene hydrocarbon have important effects upon the steps of the process and upon the properties of the resulting products. In many cases, as illustrated in Table I, the polymerization of a mixture of polymerizable compounds proceeds faster than that of butadiene alone, even though the second polymerizable compound is not readily polymerizable by itself. For this reason alone it is often desirable to use a suitable second polymerizable compound along with the butadiene hydrocarbon. Acrylic and metacrylic nitriles and methyl methacrylate, for example, may be used for this purpose. The use of these compounds, for example, along with the butadiene also increases the tensile strength, resistance to abrasion, and resistance to the absorption of hydrocarbons such as petroleum distillates, of the vulcanized polymers. The hydrocarbon resistance is especially marked in the case of the products made with the nitriles, particularly acrylic nitrile.

As the proportion of the butadiene hydrocarbon in the polymerizable mixture is decreased, the strength and abrasion resistance of the vulcanized products increase, as a general rule, and their pliability, resilience, and extensibility decrease, except in some cases where the second polymerizable compound (chloroprene, for example) is itself capable of forming rubber-like polymers. There is usually a definite proportion of butadiene at which a desired combination of properties may be secured.

In the case of acrylic and methacrylic nitriles and methyl methacrylate, for example, a series of products with very useful combinations of properties is obtained when between about 50% and about 85% of the polymerizable mixture is butadiene. In the case of other systems, these limits are, in general, somewhat different. Both larger and smaller proportions than are included within such limits may be used, however, including, of course, systems in which the butadiene hydrocarbon is the only polymerizable compound.

Although in many cases both the butadiene hydrocarbon and the other polymerizable compound or compounds are all substantially completely polymerized and are believed to form a so-called interpolymer, in which the ingredients are chemically combined in the same molecule, the present invention is not limited to those systems in which interpolymerization is believed to occur. Desirable effects may be obtained when the second polymerizable compound polymerizes independently of the butadiene or even when it does not polymerize at all. In this last case the polymerizable compound plays the part of an inert solvent. A great variety of non-polymerizable compounds, such as inert solvents, oils, and softeners for the polymerizable compounds, for example, saturated, aliphatic and aromatic hydrocarbons, halogenated hydrocarbons, ketones, and esters may also be used in the polymerization and in general have the effect of giving products which, before undergoing the plasticization step, are somewhat more plastic than when no solvent is used. Compare, for instance, Examples 3 and 5. Some solvents have additional effects. For example, carbon disulfide increases the solubility of the sulfur and chlorinated hydrocarbons with more than one chlorine atom on the same carbon atom, particularly carbon tetrachloride, accelerate the polymerization. This effect is illustrated by comparison of Examples 3 and 5. The use of carbon tetrachloride is a preferred feature of the present invention.

The polymerization may also be accelerated by the usual polymerization catalysts such as hydrogen peroxide, benzoyl peroxide, ammonium persulfate and sodium perborate, as well as by increasing the temperature, pressure, or concentration of emulsifying agent or by adjusting the hydrogen ion concentration or by the choice of emulsifying agent.

Any form of sulfur may be used but a form which is soluble in the polymerizable compounds is preferred, for example, ordinary rhombic sulfur. It may be dissolved in the polymerizable compounds before their emulsification or may be introduced into them by any other suitable method, such as that given in the above examples. Particularly when high proportions of sulfur are desired it is advantageous to dissolve the sulfur in a solvent such as carbon disulfide or a highly chlorinated naphthalene. The sulfur may also be added to the water phase in the form of an aqueous dispersion provided conditions are such that the sulfur dissolves in the chloroprene phase in substantial amount before polymerization. In short, any method of adding the sulfur may be used which produces this latter result. Amounts of sulfur as low as 0.1% or less, based on the diene hydrocarbon may be used. On the other hand, amounts up to the maximum soluble in the non-aqueous phase under the experimental conditions may be used and sometimes it is even desirable to have undissolved sulfur present. As may be seen in Table I (Examples 2, 3, and 4) the greater the proportion of sulfur, the lower is the plasticity number of the plasticized product, or, in other words, the greater is the ease of plasticization. On the other hand, the speed of polymerization is sometimes reduced by increasing the proportion of sulfur. The preferred proportions of sulfur therefore lie within a wide range, say from about 0.2% of the total polymerizable material up to the maximum proportion soluble in the non-aqueous phase under the conditions of the polymerization and the precise proportion to be selected will depend upon the relative importance to the operator of speed of polymerization, ease of plasticization, and similar factors.

Any emulsifying agent may be used which is capable of giving a permanent dispersion of the polymerizable materials. Since it is often advantageous to work in slightly acid dispersions, the most suitable emulsifying agents are those which give stable acid dispersions and which do not promote, to an undesirable extent, the hydrolysis of compounds such as esters and nitriles which may be present. It has been found that substituted ammonium or sulfonium salts containing long chain (12 or more carbon atoms) hydrocarbon groups are particularly suitable. In this class, a betaine with the long chain attached to the carbon atom, such as the C-cetyl betaine used in many of the above examples, is preferred, particularly when the polymerizable materials include an unsaturated nitrile. Other valuable members of the class are cetyl trimethyl ammonium bromide (see Example 8), cetyl methyl piperidinium methyl sulfate

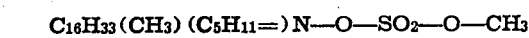

oleoamidoethyl dimethyl amine acetate,

parastear amidophenyl trimethyl amine methyl sulfate,

and N-stearyl betaine,

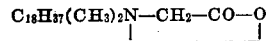

Other types of dispersing agents may also be used, such as the soluble salts of sulfonic acids containing the naphthalene nucleus and of the sulfuric acid esters of long-chain aliphatic alcohols. It is often advantageous to use a mixture of two types of dispersing agents, such as a mixture of a betaine and one of the salts just discussed.

A 2 or 3% solution of the agents in water is usually suitable for forming a good dispersion but considerably stronger or weaker solutions, for example, from about 0.2% to about 15% may also be used. The preferred concentration of the emulsifying agent is from about 2% to about 8%. It is also possible to add more emulsifying agent during the course of the polymerization, if desired, either continuously or in one or more batches. The polymerization is conveniently carried out in a slightly acid dispersion as in the examples but it should be understood that the dispersion may be either alkaline, neutral, or acid, provided that conditions are not such that the dispersion is interfered with or coagulation induced or that the unsaturated esters, nitriles, etc., are hydrolyzed to an undesirable extent.

It is possible to further vary the manner of applying the invention by varying the concentration of the dispersed phase in the emulsion. It has been found that small amounts of the emulsifying solution give thick emulsions which are difficult to maintain at the desired temperature, while large proportions of solution require inconveniently large reaction vessels and excessive amounts of coagulating agents, although it is possible to use such extreme concentration. It is to be understood, however, that the invention is not limited to the particular concentration of the dispersed phase used in the examples. Preferred conditions consist in the use of an amount, by weight, of dispersion medium which is equal to from about 100% to about 200% of the dispersed phase.

The dispersion may be made by any suitable method, such as agitation in a closed container as described in the above examples or passage through a centrifugal pump or similar device causing turbulent flow. It has been found that the best products are obtained if the dispersed phase is emulsified to form very fine particles. In polymerizing large quantities, it is usually most convenient to form the dispersion at low temperature and then introduce it into the vessel in which it is to be polymerized.

The polymerization may be carried out at any temperature from about 20 to about 100° C. or above. It has been found, however, that temperatures in the range between 50 and 70° are in general the most suitable. At lower temperatures the polymerization is usually too slow while at higher temperatures more elaborate equipment is required to withstand the high pressure and certain properties of the product are adversely affected.

The polymerization is usually carried to substantial completion, although, if a polymer is desired which may be plasticized with exceptional ease, only a portion of the polymerizable material may be polymerized in one step and the unpolymerized portion recovered. The emulsion polymerization disclosed herein may be carried out continuously by a method similar to that described for chloroprene by Starkweather and Collins in their copending application, Serial No. 156,518, filed July 30, 1937.

The polymer dispersions may be coagulated by any of the known methods applicable to dispersions made with the particular dispersing agent employed. Ethyl alcohol is generally applicable to substituted ammonium salt dispersions. A more economical method is that disclosed in the copending application of Calcott and Youker, a preferred embodiment of which consists of first adding sodium chloride and then adding a 7% solution of normal butyl alcohol in water. In this way a rapid and complete coagulation is obtained with the use of only a small amount of alcohol. Coagulation may also be very advantageously brought about by the method disclosed in the copending application of Calcott & Starkweather, Serial No. 107,360, filed October 24, 1936. According to a preferred form of this method, an internally cooled drum, part of which dips into the dispersion, is rotated in such a manner that a thin layer of the dispersion is frozen thereon and maintained at the low temperature out of contact with the unfrozen dispersion for a time long enough to cause complete coagulation. The frozen layer is then removed from the drum and warmed. A continuous layer of coagulum results, which, because of its physical form is readily washed and dried.

Although in certain cases there may be some reason for allowing the emulsifying agents to remain in the polymer after coagulation, it is generally preferable to remove substantially all of them before the final milling. This may be accomplished in any desired manner, for example, by washing the polymer with warm water on corrugated rolls, assisting the extraction, if it is desirable, by using a solvent which dissolves the emulsifying agent but not the polymer such as alcohol, acetone, etc. Milling may bring about a sufficient drying of the polymer but where this is not deemed satisfactory the polymer may be additionally dried, for example, by passing it in contact with a current of warm air. Milling on a rubber mill also assists in removing volatile material from the polymer but other means for effecting its removal are often resorted to, for example, as is disclosed in the copending application of Calcott and Starkweather, Serial No. 107,360, filed October 24, 1936, and referred to above, for example, washing the polymer in thin films with solvents.

The latices prepared as described above may, in general, be used for all the various purposes for which natural latex may be used, although the stabilized latices, as indicated, have a broader field of utility and show advantages even within the field where unstabilized latices are satisfactory. Thus, these latices may be employed to produce thin-walled articles, or to impregnate or coat cloth, etc., or for the many other purposes for which natural latex is used. To this end they may be compounded, particularly when stabilized with an alcohol or a ketone as described above, and then cured to a strong elastic state resembling vulcanized rubber. The compounding and curing of the latices are sufficiently similar to the compounding and curing of natural rubber latices as to make it unnecessary to detail here their many variations.

There has been described above a novel and preferred method for preparing sulfur containing polymers of the diene hydrocarbons which may be plasticized as described herein. It should be understood, however, that the present invention is not limited to the above described method for preparing plasticizable polymers of butadiene and such of its homologs as come withing the scope of this invention. Instead, the present invention includes the plasticization (as illustrated above and described more fully below) of any polymers of the diene hydrocarbons disclosed above which have been prepared by polymerization in the presence of sulfur, whether the polymerization be conducted in aqueous emulsion or by any other method. The emulsion polymerization method is preferred since it permits of better control of the properties of the final products.

As disclosed above, the sulfur containing diene hydrocarbon polymers are plasticized by incorporating in the polymers one or more compounds of the general formula R—S—R$_1$ and subjecting the resulting composition to conditions adapted to develop plastic properties. The scope of this general formula is illustrated by the specific compounds:

Thiobetanaphthol
Mercaptobenzothiazol
Potassium hexamethylene dithiocarbamate
Diphenyl disulfide
Dibenzoyl disulfide
Tetramethyl thiuram disulfide
Dibenzothiazyl disulfide
Bis-carbomethoxyphenyl-tetra-sulfide
Bis-ethyl-thio-xanthogen
Bis-isopropyl-xanthogen
Octyl mercaptan
Paranitrothiophenol Thiobenzoic acid
Mercapto dimethylbenzothiazol
Sodium dimethyl dithiocarbamate
Hexamethylene imine salt of hexamethylene dithiocarbamate
Piperidine salt of pentamethylene dithiocarbamate
Bis dinaphthoyl disulfide
Dipentamethylene thiuram tetrasulfide As shown in part by this list the nature of the groups from which R and $R_1$ in the general formula may be selected is subject to great variation without exceeding the scope of the invention or producing compounds for which the process is inoperable. Thus, the alkyl groups may be straight chain or branched, primary, secondary, or tertiary, saturated or unsaturated, long or short and include hydroaromatic groups, such as cyclohexyl. The aryl groups may be phenyl, tolyl, xylyl, naphthyl, benzyl, etc. Both the alkyl and aryl groups may contain, in addition to carbon and hydrogen, various radicals such as nitro, chloro and carbomethoxy as illustrated above.

The thiazyl group

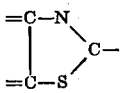

may have the two adjacent carbon atoms forming a part of an aromatic nucleus, which is subject to the same variation as the aryl group discussed above. In the thiocarbamyl group, RR'NC(=S)—, the xanthogenyl group

RO—(CS)— and the thioxanthogenyl group RS—(CS)—, the radicals represented by R and R' may be either alkyl or aryl of the scope discussed above. Both together may be a divalent group such as penta- or hexamethylene. In the aromatic acyl and thioacyl groups, the aromatic portions are also subject to the same variation as already discussed. By "base-forming radical" is meant an element of the alkali or alkaline earth groups or an ammonium or substituted ammonium group, such as sodium, potassium, calcium, magnesium, ammonium, tetramethyl ammonium, piperidinium ($(CH_2)_5NH_2$—) and the like.

Although many of the compounds in the above list such as the polysulfides have symmetrical structures, this is only because such compounds are generally more easily prepared than the unsymmetrical ones represented by the general formula. Unsymmetrical compounds such as:

Phenyl ethyl disulfide
Phenyl naphthyl disulfide
Phenyl benzoyl disulfide
Benzoyl thiobenzoyl disulfide
Phenyl thiocarbamyl disulfide
Thiobenzoyl thiocarbamyl disulfide
Benzothiazyl benzoyl disulfide
Benzothiazyl thiocarbamyl disulfide
Dimethyl ethyl phenyl thiuram tetrasulfide obviously have properties similar to those of the corresponding symmetrical compounds and function similarly in the present invention. The free dithiocarbamic, xanthogenic, and thioxanthogenic acids included in the general formula are in many cases unstable and are conveniently added in the form of their salts, as the mercaptans and thio acids may also be added. These salts are provided for in the general formula when $R_1$ is a base-forming radical.

As agents which have been found particularly useful may be mentioned the thiuram polysulfides such as tetramethyl thiuram disulfide, aromatic mercaptans such as thiobetanaphthol, and dithiocarbamates, such as hexa- and pentamethylene dithiocarbamates.

The compound of the general formula may be introduced into the polymer by any convenient method whereby it may be uniformly distributed throughout the material. Thus, for example, it may be incorporated by milling into the dry polymer or, may be added to the dispersion of the polymer before coagulation as an aqueous solution or dispersion.

Although in the case of mercaptans and dithiocarbamates (see Examples 17 to 19), and, to some extent, in the case of other compounds of the general formula, well plasticized products are obtained as soon as the reagent is thoroughly incorporated by mill, in many cases a further treatment is desirable in order to develop the full plasticity of the product. This treatment may consist, for example, of a more prolonged milling, such as is used in plasticizing natural rubber, or of storage, particularly at an elevated temperature, as illustrated in column C in Table I, or particularly, of treatment with alkaline materials such as amines which give bases with dissociation constants greater than about $10^{-6}$, or of combinations of these treatments. As examples of amines which give rapid plasticization when used with the compounds of the general formula, there may be mentioned benzyl amine, oleyl amine, diethanol amine, dicyclohexyl amines, tributyl amine, dimethyl stearyl amine, and ethylene diamine, as well as dibutylamine, di-ortho-tolyl guanidine, and piperidine, which are used in the above examples. The condensation products of aldehydes with amines, many of which have been developed as accelerators for the vulcanization of natural rubber, in many cases function like the amines discussed above when incorporated into the polymers of butadiene and its homologs prepared in the presence of sulfur and containing the compounds of the general formula R—S—$R_1$. Especially effective are (1) the condensation products of aniline and its homologues with acetaldehyde and the high aliphatic aldehydes and (2) the condensation products of aliphatic diamines with aromatic aldehydes. Examples of these groups are the condensation products of aniline with acetaldehyde, hexanal, and ethyl isopropyl acrolein, of hexamethylene diamine with benzaldehyde, and of ethylene diamine with salicyl aldehyde. Another group of compounds active in this way is represented by thio-carbanilide. Compounds which liberate amines under the conditions used for plasticizing the polymers may also be used. An example of this type of agent is trimethylamine oleate. Practically speaking, diaryl guanidines, such as di-ortho-tolyl guanidine, are the preferred amines, since they are non-volatile and therefore are not lost on the hot mill and do not give an odor. A similar effect is also observed when certain slightly basic inorganic compounds such as magnesium oxide, are used in place of the amines. The amines are preferably added to the dry polymer on the mill but may also be advantageously added to the latex before coagulation. Dried films may be plasticized by exposure to volatile amines or ammonia in the vapor phase. Preferred alkaline auxiliary agents are the amines generally, particularly dibutylamine, piperidine and di-ortho-tolyl guanidine, as disclosed above.

The plasticity of the plasticized product depends, as already discussed, in part upon the proportion of sulfur used, the presence of solvents during polymerization, and the yield, that is, the extent of polymerization. Obviously, it also depends upon the kind and proportion of polymerizable substances used. The plasticity is subject to further control, as illustrated in part in Table II, through the choice of plasticizing agents (including both compounds of the general formula R—S—R₁ and basic substances described above) and also through the choice of the amounts of these agents and the conditions under which they are introduced. The larger the proportion of reagent, the greater the plasticity of the product. In some cases, from 1 to 2% of the R—S—R₁ compound and from 0.5 to 1.0% of the amine are preferred but obviously it is impossible to give narrow ranges which will be applicable to all cases, since some polymers are much more readily plasticized than others. It is obvious, however, that a given polymer may be plasticized to any desired extent by a proper control of the various factors discussed above. Heating or storing the polymer after the incorporation of the plasticizing agents often causes a still further increase in plasticity, as in Example 13. This is particularly true when a thiuram disulfide is present. The thiuram disulfides may therefore be used to advantage as stabilizing agents in cases where the polymer would otherwise decrease in plasticity on storage or heating.

The compounding of the plasticized products of this invention in general follows the principles used for natural rubber. Thus, the presence of an antioxidant of the class effective for natural rubber is important, especially since the synthetic materials, unlike the rubber, contain no natural antioxidant. The antioxidant may be incorporated into the dry product on a rubber mill or may be advantageously added in the form of a dispersion to the polymer dispersion before coagulation. Sulfur or its equivalent is used to bring about vulcanization, along with an organic vulcanization accelerator and auxiliary agents such as zinc oxide and stearic acid. All or part of the sulfur and accelerator required for vulcanization may have already been added during the preparation of the plastic polymer. In general, all of the filling and reinforcing agents and pigments used for rubber may be used here. Carbon black is particularly useful for reinforcing. Other agents known in the rubber art for softening, stiffening, reodorizing, or for producing or altering other special properties may also be added.

The plasticized products of the present invention may be used in the rubber art for practically all the purposes for which natural rubber is used. Moreover, as a result of their plasticity, tackiness, and solubility in organic solvents, in the uncured state they can be handled with much greater facility and more cheaply in operations such as compounding, sheeting, plying, calendering, tubing, coating, and impregnating than any previously described butadiene polymer with comparable physical properties in the vulcanized state. Another advantage of the plastic products of this invention over the corresponding butadiene polymers made in absence of sulfur is their much greater ability to take up pigments such as carbon black without loss of working properties. Thus, 100 parts of polymer made as in Example 7, except that only 0.25% of dibutylamine was used, when compounded with 130 parts of soft black, 20 parts of reinforcing black, one part each of stearic acid and sulfur and 5 parts of zinc oxide gives a stock which could be very readily tubed. In addition to having most of the properties of natural rubber, many of the products of the present invention are much superior to natural rubber in many important respects. Thus, for example, as already discussed, many of them particularly those made from mixtures of butadiene with derivatives of unsaturated acids, such as methyl methacrylate and, especially, acrylic nitrile, show, when vulcanized, a very much greater resistance to the swelling action of petroleum distillates than natural rubber.

It is apparent that many widely different embodiments of this invention may be made without departing from the spirit and scope thereof and therefore it is not intended to be limited except as indicated in the appended claims.

We claim:

1. In a process for making plastic, rubber-like materials by polymerizing, in the presence of sulfur, a diene hydrocarbon of the general formula

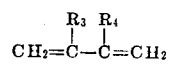

wherein each of the radicals, R₃ and R₄, is a member of the group consisting of hydrogen and hydrocarbon radicals, and then plasticizing the polymerized material, the step of adding to the polymerized material at least one compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above.

2. In a process for making plastic, rubber-like materials by polymerizing, in the presence of sulfur, a diene hydrocarbon of the general formula

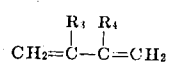

wherein each of the radicals, R₃ and R₄, is a member of the group consisting of hydrogen and hydrocarbon radicals, and then plasticizing the polymerized material, the steps of adding to the polymerized material at least one compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above, and adding an amine which gives a base with a dissociation constant greater than about $10^{-6}$.

3. In a process for making plastic, rubber-like materials by polymerizing, in aqueous emulsion, in the presence of sulfur, a diene hydrocarbon of the general formula

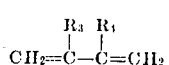

wherein each of the radicals, R₃ and R₄, is a member of the group consisting of hydrogen and hydrocarbon radicals, coagulating the emulsion, and then plasticizing the polymerized material, the step of adding to the polymerized material at least one compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above.

4. In a process for making plastic, rubberlike materials by polymerizing, in aqueous emulsion, in the presence of sulfur, a diene hydrocarbon of the general formula

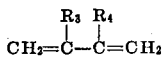

wherein each of the radicals, R₃ and R₄, is a member of the group consisting of hydrogen and hydrocarbon radicals, coagulating the emulsion, and then plasticizing the polymerized material, the steps of adding to the polymerized material at least one compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above, and adding an amine which gives a base with a dissociation constant greater than about $10^{-6}$.

5. In the process for making plastic, rubber-like materials by polymerizing butadiene, in aqueous emulsion, in the presence of sulfur, and then plasticizing the polymerized material, the step of adding to the polymerized material at least one compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above.

6. In a process for making plastic, rubber-like materials by polymerizing butadiene, in aqueous emulsion, in the presence of sulfur, and then plasticizing the polymerized material, the steps of adding to the polymerized material at least one compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above, and adding an amine which gives a base with a dissociation constant greater than about $10^{-6}$.

7. A composition comprising a rubber-like material made by polymerizing, in the presence of sulfur, a diene hydrocarbon of the general formula

wherein each of the radicals, R₃ and R₄, is a member of the group consisting of hydrogen and hydrocarbon radicals and at least one uncombined compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above.

8. A composition comprising a rubber-like material made by polymerizing, in the presence of sulfur, a diene hydrocarbon of the general formula

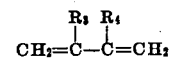

wherein each of the radicals, R₃ and R₄, is a member of the group consisting of hydrogen and hydrocarbon radicals and at least one uncombined compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above, and an amine which gives a base with a dissociation constant greater than about $10^{-6}$.

9. A composition comprising a rubber-like material made by polymerizing butadiene in the presence of sulfur and at least one uncombined compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above.

10. A composition comprising a rubber-like material made by polymerizing butadiene in the presence of sulfur and at least one uncombined compound of the general formula R—S—R₁ in which R is a member of the group consisting of alkyl, aryl, thiazyl, thiocarbamyl, xanthogenyl, thioxanthogenyl, aromatic aryl, and aromatic thioacyl groups, and R₁ is a member of the group consisting of hydrogen, base-forming radicals, and radicals represented by —S$_n$—R₂ in which $n$ is a whole number less than 4 and R₂ is one of the groups represented by R above, and an amine which gives a base with a dissociation constant greater than about $10^{-6}$.

11. In the process for making plastic, rubberlike materials by polymerizing butadiene-1,3 in the presence of sulfur and then plasticizing the polymerized material, the step of adding to the polymerized material a dithiocarbamate.

12. In the process for making plastic, rubberlike materials by polymerizing butadiene-1,3 in the presence of sulfur and then plasticizing the polymerized material, the step of adding to the polymerized material hexamethylene dithiocarbamate.

13. In the process for making plastic, rubberlike materials by polymerizing butadiene-1,3 in the presence of sulfur and then plasticizing the polymerized material, the step of adding to the polymerized material a mercaptan.

14. In the process for making plastic, rubberlike materials by polymerizing butadiene-1,3 in the presence of sulfur and then plasticizing the polymerized material, the step of adding to the polymerized material thio-beta-naphthol.

15. In the process for making plastic, rubber-like materials by polymerizing butadiene-1,3 in the presence of sulfur and then plasticizing the polymerized material, the step of adding to the polymerized material a thiuram disulfide.

16. In the process for making plastic, rubber-like materials by polymerizing butadiene-1,3 in the presence of sulfur and then plasticizing the polymerized material, the step of adding to the polymerized material a tetra alkyl thiuram disulfide.

17. In the process for making plastic, rubber-like materials by polymerizing butadiene-1,3 in the presence of sulfur and then plasticizing the polymerized material, the step of adding to the polymerized material a tetra alkyl thiuram disulfide and a diarylguanidine.

HOWARD W. STARKWEATHER.
MORTIMER A. YOUKER.